(12) United States Patent
Ku et al.

(10) Patent No.: US 10,858,506 B2
(45) Date of Patent: Dec. 8, 2020

(54) CONDUCTIVE HEATING COMPOSITION AND FLEXIBLE CONDUCTIVE HEATING DEVICE USING THE SAME

(71) Applicant: FLEXHEAT CORP., New Taipei (TW)

(72) Inventors: Chi-Hao Ku, New Taipei (TW); Che-Chian Ko, New Taipei (TW); Chia-Nan Hsieh, New Taipei (TW)

(73) Assignee: FLEXHEAT CORP., New Taipei (TW)

( * ) Notice: Subject to any disclaimer, the term of this patent is extended or adjusted under 35 U.S.C. 154(b) by 0 days.

(21) Appl. No.: 16/438,806

(22) Filed: Jun. 12, 2019

(65) Prior Publication Data

US 2020/0207959 A1  Jul. 2, 2020

(30) Foreign Application Priority Data

Dec. 26, 2018  (TW) .............................. 107147137 A

(51) Int. Cl.
| | |
|---|---|
| *H01B 1/22* | (2006.01) |
| *C08K 3/00* | (2018.01) |
| *C08L 23/00* | (2006.01) |
| *C08L 23/08* | (2006.01) |
| *C08L 51/06* | (2006.01) |
| *C08K 3/04* | (2006.01) |
| *C08K 3/14* | (2006.01) |
| *C08L 23/14* | (2006.01) |
| *H05B 3/14* | (2006.01) |
| *C08K 3/013* | (2018.01) |

(52) U.S. Cl.
CPC .......... *C08L 23/0815* (2013.01); *C08K 3/013* (2018.01); *C08K 3/042* (2017.05); *C08K 3/14* (2013.01); *C08L 23/0853* (2013.01); *C08L 23/0869* (2013.01); *C08L 23/14* (2013.01); *C08L 51/06* (2013.01); *H01B 1/22* (2013.01); *H05B 3/145* (2013.01); *C08K 2201/001* (2013.01)

(58) Field of Classification Search
CPC ... H01B 1/00; H01B 1/22; H01B 1/24; C09D 5/24; C08K 3/017; C08K 2201/001
See application file for complete search history.

(56) References Cited

U.S. PATENT DOCUMENTS

| | | | | |
|---|---|---|---|---|
| 4,774,277 | A * | 9/1988 | Janac | ...................... C08L 23/04 523/351 |
| 7,544,311 | B2 * | 6/2009 | Chen | ...................... H01B 1/24 219/505 |
| 2004/0222406 | A1 * | 11/2004 | Chen | ...................... H01C 7/027 252/500 |

* cited by examiner

*Primary Examiner* — Mark Kopec
(74) *Attorney, Agent, or Firm* — Hamre, Schumann, Mueller & Larson, P.C.

(57) ABSTRACT

A conductive heating composition includes a polyolefin elastomer, a crystalline non-grafted polyolefin, a crystalline polymer which is grafted or copolymerized with a monomeric unit, and a conductive filler. The composition has a surface resistivity ranging from 1.0E+01 ohm to 1.0E+06 ohm, and a volume resistivity ranging from 8.0E+01 ohm-cm to less than 1.0E+05 ohm-cm. When the composition is heated from 20° C. to 90° C., a log value of a resistance of the composition increases with a slope ranging from 3E−02 log ohm/° C. to 9E−02 log ohm/° C. After a specimen made of the composition is repeatedly bent 300 times, a surface resistance of the specimen at a room temperature increases by a rate of less than 300%.

12 Claims, 11 Drawing Sheets

CONDUCTIVE HEATING COMPOSITION AND FLEXIBLE CONDUCTIVE HEATING DEVICE USING THE SAME

CROSS-REFERENCE TO RELATED APPLICATION

This application claims priority from Taiwanese invention patent application No. 107147137, filed on Dec. 26, 2018.

FIELD

The disclosure relates to a conductive heating composition, more particularly to an intelligent conductive heating composition which prevents overheating and which regulates itself with regard to its temperature. The disclosure also relates to a flexible conductive heating device using the conductive heating composition, which is useful in the fields of heating devices, heat preservation devices, over-current protection devices, etc.

BACKGROUND

Currently, conductive polymer composite materials, which are sensitive to temperature and current and which can self-limits and self-regulates its temperature, are widely used in the fields of heating devices, heat preservation devices, over-current protection devices, etc. Such conductive polymer composite materials have different conductivities at different temperatures. In addition, when a current greater than a critical current value passes through the conductive polymer composite materials, the conductivities of the conductive polymer composite materials change exponentially.

A conventional conductive polymer composite material in the fields of heating devices and heat preservation devices is mainly used for making a self-limiting heating device. Once a sufficient current is applied to the self-limiting heating element to initiate a phase change in microstructures of the conductive polymer composite material, a resistance of the conductive polymer composite material increases sharply, and a temperature of the self-limiting heating element is elevated to above the ambient temperature simultaneously. Normally, the highest temperature of the self-limiting heating element is substantially close to a melting point of the conductive polymer composite material. Furthermore, a degree of crystallinity in the microstructures of the conductive polymer composite material may change with the ambient temperature, which in turn changes the conductivity and the current passing through the conductive polymer composite material so as to enable the conductive polymer composite material to self-regulate energy used for heating. Thus, the self-limiting heating element may provide a constant surface temperature without the need for an external temperature controller, and may prevent over-heating or over-temperature. As such, the self-limiting heating element under normal operation does not raise safety concerns. Particularly, when the temperature of the self-limiting heating element is high enough, the resistance of the conductive polymer composite material increases sharply (i.e., the conductivity of the conductive polymer composite material drops sharply), and thus the energy consumption of the self-limiting heating element may be reduced effectively, thereby saving the energy. However, the conventional self-limiting heating element, based on its conductive polymer composite material and intrinsic properties, may be inflexible or may have "hot lines" due to uneven heat distribution.

A heating element made of a conventional conductive polymer composite material may be formed into a laminate as shown in FIG. 1 or a dumbbell as shown in FIG. 2. To meet the application needs, a conductive heating layer 6 of the laminate shown in FIG. 1 is required to have a volume resistance ranging from $10^{-3}$ ohm-cm to $10^1$ ohm-cm, and thus, the conductive heating layer 6 may be made of a hard brittle polymer material and thus is less likely to be flexible. In addition, two metal foil electrodes 5, which may be nickel coated copper foils, are formed on two opposite surfaces of the conductive heating layer 6 by virtue of high temperature and high pressure. The laminate is almost inflexible due to attachment forces among metal foils electrodes 5 and the conductive heating layer 6.

The conventional heating element in the dumbbell form may have two metal wire electrodes 5' embedded in a conductive heating member 6'. When bending the heating element in the dumbbell form, the metal wire electrodes 5' are bent in the same direction to have limited flexibility. However, a clearance between the conductive heating member 6' and each of the metal wire electrodes 5' may become varied after repeated bending of the dumbbell, which may adversely affect the stability in performance of the heating element.

FIG. 3 is a temperature versus resistance graph for a conventional conductive polymer composite material. When the temperature of the conductive polymer composite material is raised from the room temperature to close to its softening point, a log value of the resistance (conductivity) changes at a slope of less than 2.0E–02 (i.e., the resistance barely changed with temperature). After the temperature is raised above the softening point, the resistance abruptly and exponentially increases before the temperature reaches a melting point of the conductive polymer composite material. In other words, when electricity is applied to the conductive polymer composite material, a phase change is initiated in the microstructures of the conductive polymer composite material so that the temperature of the conductive polymer composite material is limited to the temperature corresponding to the zone where the resistance rises abruptly, and is almost not changeable by varying the voltage or the current applied to the conductive polymer composite material.

Furthermore, during operation of the self-limiting heating element, the conductive polymer composite material may be heated unevenly, which causes different regions of the self-limiting heating element to be subjected to different stresses. The regions subjected to higher stressing forces, such as those disposed between the electrodes of the self-limiting heating element, may have relatively high temperatures. The high temperature regions on the self-limiting heating element are commonly called as "hot lines", and may be aged or partially burnt especially when a relatively high voltage (ex., a voltage larger than 24 Vdc) is applied to the self-limiting heating element.

To enable flexibility of the self-limiting heating element, in Taiwanese patent publication No. 1407460, Taiwanese patent application publication No. 200848488 corresponding to U.S. patent application publication No. 20100038025 A1, U.S. Pat. Nos. 7,049,559, 7,053,344, 8,367,987, U.S. patent application publication No. 20100038356 A1, etc., it is proposed to apply the conductive polymer composite material on a porous substrate. In this case, the conductive polymer composite material may delaminate from the porous substrate due to mechanical mismatch between the material and the porous substrate, and thus such self-limiting heating element is not durable. In addition, such self-limiting heating element may deform, after several cycles of stress relaxation, due to the mechanical mismatch, which may affect the value of the resistance, and thus the self-limiting heating element may have uneven heat distribution within the material during the operation.

U.S. Pat. No. 4,560,498 discloses a positive temperature coefficient (PTC) crosslinked polymeric composition. The polymeric composition includes a first polymeric material exhibiting high green strength prior to crosslinking and elastomeric behavior subsequent to cross-linking, and a second polymeric material including a thermoplastic polymer. Examples of the first polymeric material may include natural rubber, polyisoprene, ethylene-propylene random copolymers, styrene-acrylonitrile-butadiene terpolymer rubbers, and their derivatives thereof, etc. U.S. Pat. No. 4,654,511 discloses a self-regulating electrical device which includes at least one positive temperature coefficient (PTC) layer and at least one constant wattage (CW) layer. At least a part of a surface of the CW layer is in direct electrical and physical contact with at least a part of a surface of the PTC layer. The PTC layer is composed of a PTC composition which mainly includes a thermoplastic rubber (TPR, ethylene-propylene rubber) with a small amount of a crystalline thermoplastic polymer (polypropylene) and a conductive filler dispersed therein. In each of the above two patent documents, the PCT composition includes both the thermoplastic elastomer (ex., ethylene-propylene rubber) and the thermoplastic polymer (ex., polypropylene) which are not very compatible with each other. Therefore, the conventional PTC composition may exhibit unstable behaviors and therefore raises safety concern.

U.S. Pat. No. 8,367,986 discloses a polymer compound material which is sensitive to temperature and current, and which has a volume resistivity of at least 0.1 M ohm-cm. The polymer compound material includes polydimethyl siloxane (PDMS), two conductive fillers, and an additive. Because PDMS is an amorphous material without a melting point, a resistance of such polymer compound material with PDMS may not sharply increase with increasing temperature. Therefore, although a heating element made of the PDMS-containing material may be flexible, the heating element may not have self-limiting and self regulating properties.

U.S. Pat. No. 7,544,311 and Taiwanese patent publication No. I270562 disclose a PTC polymer composition including a non-elastomeric polymer mixture and a thermoplastic elastomer (polymer stabilizer). A circuit protection device disclosed by the above two references is formed into a laminate as shown in FIG. 1, and has a relatively poor flexibility. In addition, for application in a product with a volume resistance less than 50 ohm-cm, because the PTC polymer composition has a relatively high conductivity, addition of a voltage resistance-enhancing agent to the PIC polymer composition is necessary.

SUMMARY

An objective of the disclosure is to provide a novel conductive heating composition which can overcome the aforesaid drawbacks associated with the prior art. A flexible conductive heating device using the conductive heating composition is also provided.

According to a first aspect of the disclosure, a conductive heating composition includes a polyolefin elastomer, a crystalline non-grafted polyolefin, a crystalline polymer which is grafted or copolymerized with a monomeric unit selected from carboxylic acid, carboxylic acid derivatives, and combinations thereof, and a conductive filler. The conductive heating composition has a surface resistivity ranging from 1.0E+01 ohm to 1.0E+06 ohm, and a volume resistivity ranging from 8.0E+01 ohm-cm to less than 1.0E+05 ohm-cm. When the conductive heating composition is heated from 20° C. to 90° C., a log value of a resistance of the conductive heating composition increases with a slope ranging from 3E−02 to 9E−02. After the conductive heating composition has been tested according to ISO 132:1999 procedure 300 times, a surface resistance of the conductive heating composition at a room temperature increases by a rate of less than 300%.

According to a second aspect of the disclosure, a flexible conductive heating device includes a flexible conductive heating substrate and at least one first electrode unit. The flexible conductive heating substrate is made of the conductive heating composition, and has a first major surface and a second major surface opposite to the first major surface in a thickness direction of the flexible conductive heating substrate. The at least one first electrode unit is formed on the first major surface, and includes a positive electrode and a negative electrode. The positive electrode includes a first base portion and a plurality of first finger electrode portions which extend respectively from the first base portion, and which are arranged to be separated from each other. The negative electrode includes a second base portion which is spaced apart from the first base portion, and a plurality of second finger electrode portions which extend respectively from the second base portion, and which are arranged to be interdigitated with the first finger electrode portions. Two adjacent ones of the first and second finger electrode portions are spaced apart from each other by a first distance ranging from 0.5 mm to 20 mm. Each of the first and second finger electrode portions is spaced apart from a respective one of the second and first base portions by a second distance. A ratio of the second distance to the first distance is larger than 0.8.

The conductive heating composition of the disclosure is a flexible material, and has electrical and mechanical properties superior to the conventional ones. As such, the conductive heating composition of the disclosure is useful in the fields of heating devices, heat preservation devices, overcurrent protection devices, etc. Please note that the conductive heating composition of the disclosure is used for solving aging due to uneven heat and stress distributions on a conductive heating device including such material or due to overheated regions on the conductive heating composition.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
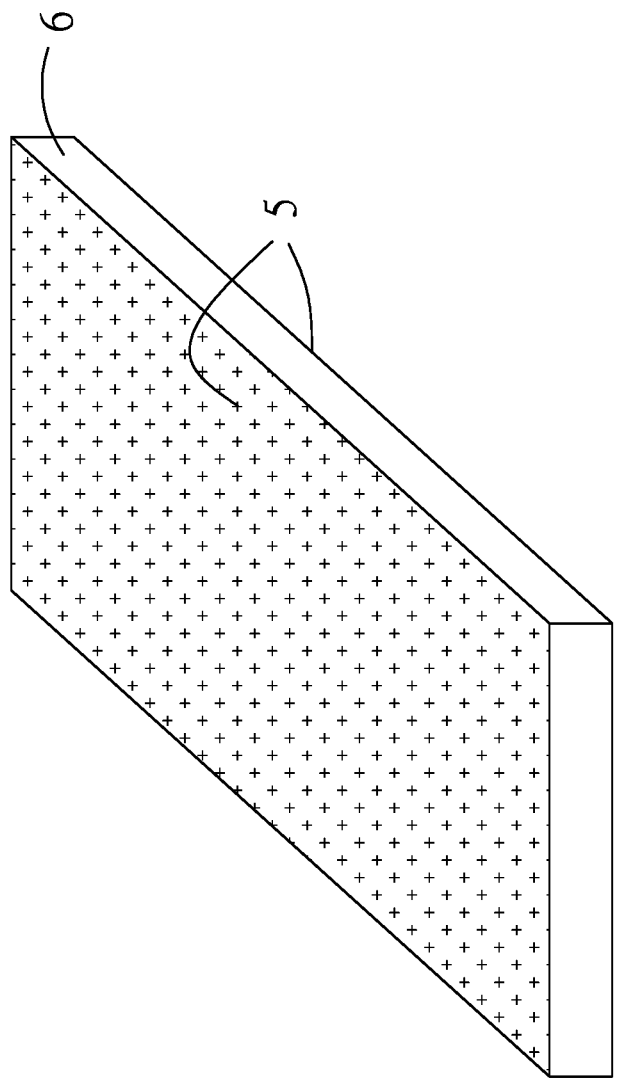
FIG. 1 is a schematic perspective view of a conventional heating element which is in a laminate form.
Figure 2:
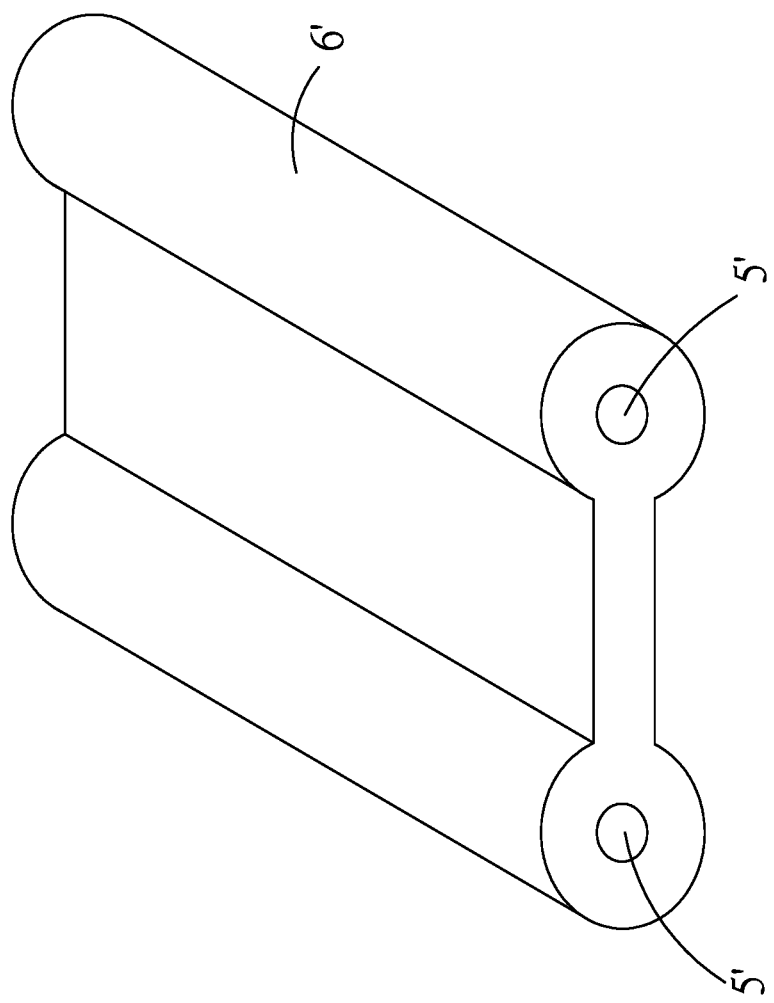
FIG. 2 is a schematic perspective view of a conventional heating element which is in a dumbbell form.
Figure 3:
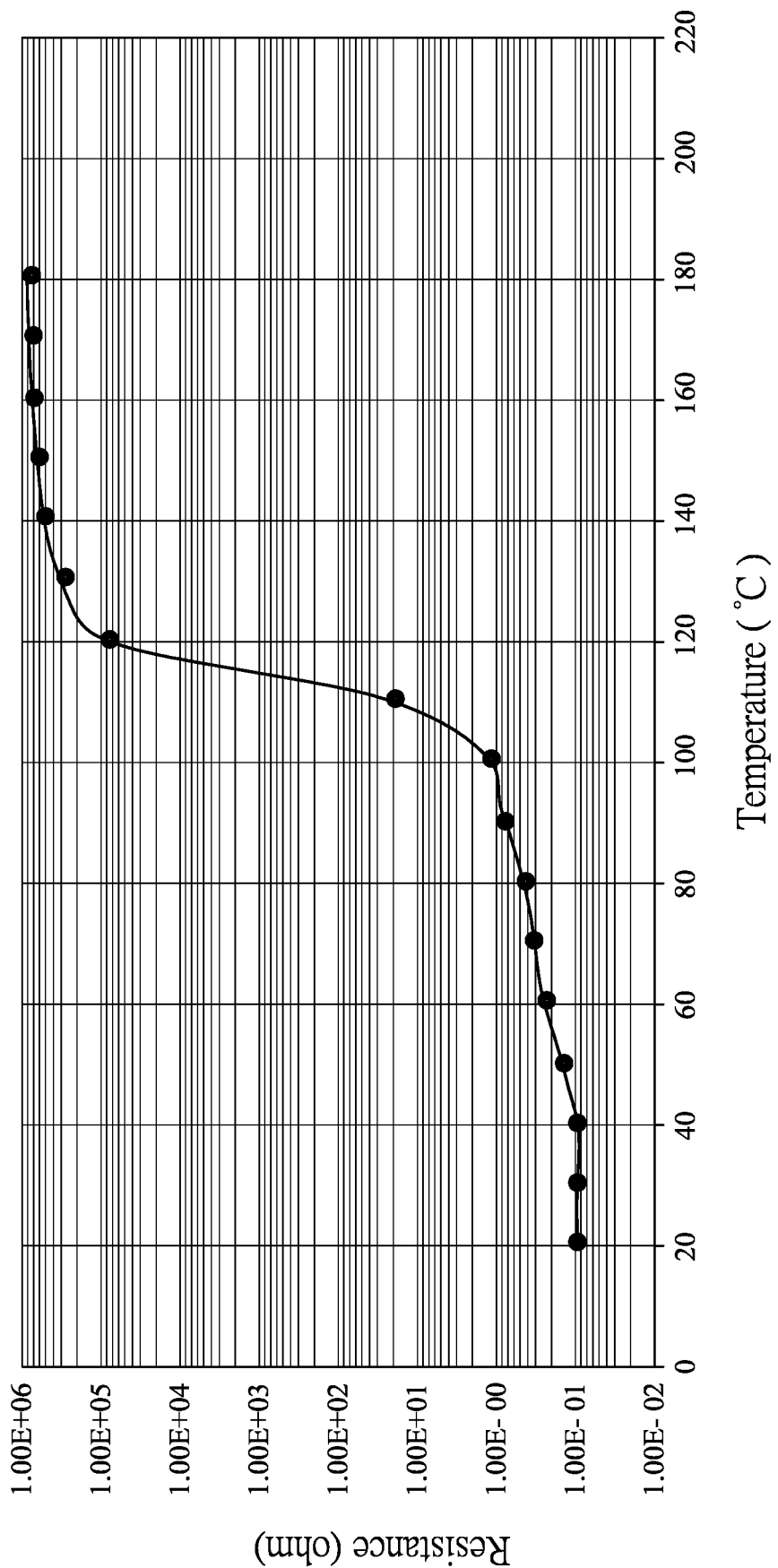
FIG. 3 is a temperature versus resistance graph for a conventional conductive polymer composite material.

Before the disclosure is described in greater detail, it should be noted that where considered appropriate, reference numerals have been repeated among the figures to indicate corresponding or analogous elements, which may optionally have similar characteristics.

A conductive heating composition according to an embodiment of the disclosure is a positive temperature coefficient material, and includes (i) a polyolefin elastomer, (ii) a crystalline non-grafted polyolefin which is different from the polyolefin elastomer, (iii) a crystalline polymer which is grafted or copolymerized with a monomeric unit selected from carboxylic acid, carboxylic acid derivatives, and combinations thereof, and (iv) a conductive filler. The conductive heating composition has a surface resistivity ranging from 1.0E+01 ohm to 1.0E+06 ohm, and a volume resistivity ranging from 8.0E+01 ohm-cm to less than 1.0E+05 ohm-cm. When the conductive heating composition is heated from 20° C. to 90° C., a log value of a resistance of the conductive heating composition increases with a slope ranging from 3E–02 to 9E–02. After the conductive heating composition has been tested according to ISO 132:1999 procedure 300 times, a surface resistance of the conductive heating composition at a room temperature increases by a rate of less than 300%.

In certain embodiments, the polyolefin elastomer is in an amount ranging from 5 wt % to 50 wt % based on 100 wt % of a total weight of the conductive heating composition.

In certain embodiments, the polyolefin elastomer is in an amount ranging from 10 wt % to 50 wt % based on 100 wt % of a total weight of the conductive heating composition.

In certain embodiments, the polyolefin elastomer is in an amount ranging from greater than 15 wt % to 50 wt % based on 100 wt % of a total weight of the conductive heating composition.

In certain embodiments, the polyolefin elastomer is in an amount ranging from 39 wt % to 50 wt % based on 100 wt % of a total weight of the conductive heating composition.

In certain embodiments, the polyolefin elastomer has shore A hardness value ranging from 40 to 95. Examples of the polyolefin elastomer include, but are not limited to, ethylene-octene copolymer, ethylene-butene copolymer, ethylene-propylene copolymer, propylene-butene copolymer, butene-ethylene copolymer, butene-propylene copolymer, etc.

Examples of the crystalline non-grafted polyolefin include, but are not limited to, polyethylene (PE), propylene (PP), polyvinylidene fluoride (PVDF), etc.

The crystalline polymer may be a crystalline grafted polymer or a crystalline copolymer. Examples of the crystalline copolymer include, but are not limited to, ethylene vinyl acetate copolymer (EVA), ethylene butyl acrylate (EBA), ethylene methyl acrylate (EMA), ethylene acrylic acid (EAA), etc. Examples of the crystalline grafted polymer include, but are not limited to, polyethylene grafted with ethylene-g-maleic anhydride, polyethylene grafted with ethylene-g-acrylic acid, etc.

In certain embodiments, the conductive filler is made of inorganic carbon, metal, or a combination thereof. Examples of the inorganic carbon include, but are not limited to, carbon black, graphite, graphene, titanium carbide (TiC), tungsten carbide (WC), tungsten titanium carbide (TiWC), etc. Examples of the metal include, but are not limited to, nickel (Ni) powder, copper (Cu) powder, etc.

In certain embodiment, the conductive heating composition may further include an additive, which may be a volume filler, a flame retardant, or a coupling agent. For example, the additive may be calcium carbonate, metal hydroxide, silane coupling agent, or combinations thereof. Examples of the metal hydroxide may include, but are not limited to, magnesium hydroxide, etc.

Figure 4:
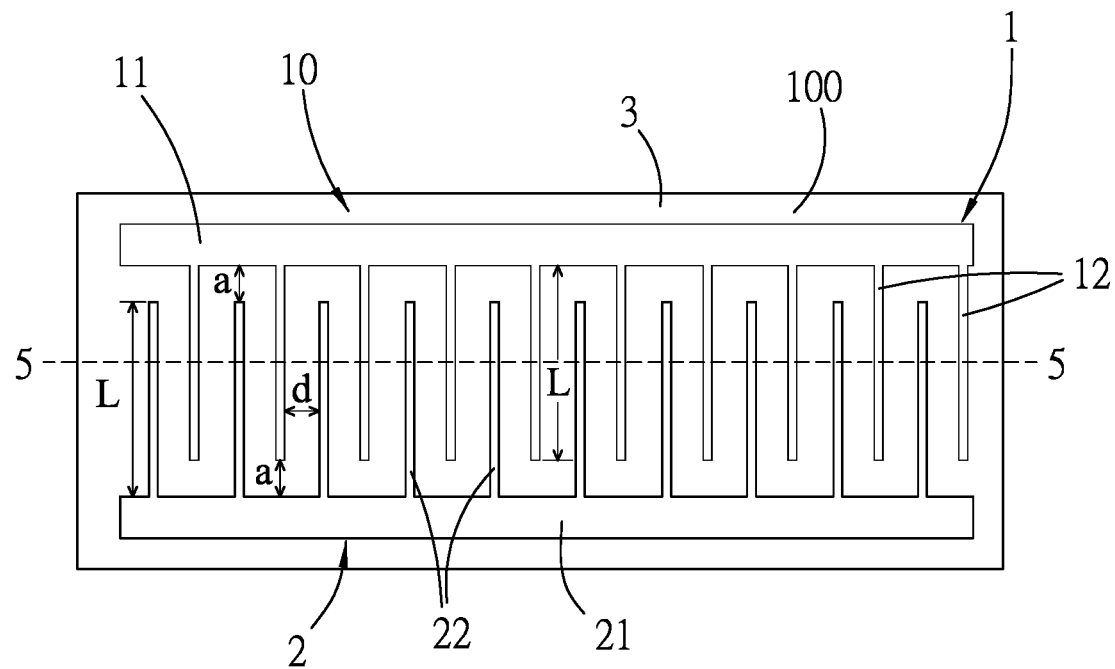
FIG. 4 illustrates a schematic top view of a flexible conductive heating device according to a first embodiment of the disclosure.
Figure 5:
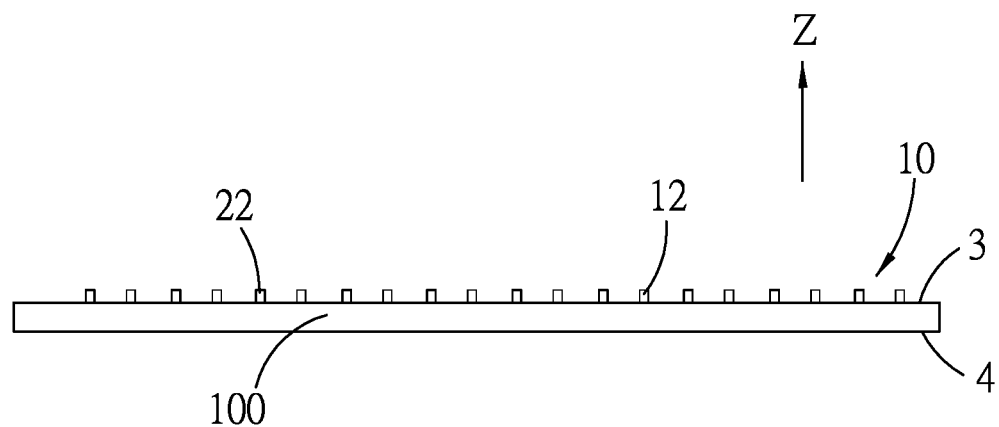
FIG. 5 is a cross-sectional view taken along line 5-5 of FIG. 4.

FIGS. 4 and 5 illustrate a flexible conductive heating device according to a first embodiment of the disclosure. The flexible conductive heating device is flexible and has self-temperature-limiting and self-current-regulating properties. The flexible conductive heating device includes a flexible conductive heating substrate 100 and at least one first electrode unit 10. The flexible conductive heating substrate 100 is made of the conductive heating composition, and includes a first major surface 3 and a second major surface 4 opposite to the first major surface 3 in a thickness direction (Z) of the flexible conductive heating substrate 100.

The first electrode unit 10 is formed on the first major surface 3, and includes a positive electrode 1 and a negative electrode 2. The positive electrode 1 includes a first base portion 11 and a plurality of first finger electrode portions 12 which extend respectively from the first base portion 11, and which are arranged to be separated from each other. The negative electrode 2 includes a second base portion 21, which is spaced apart from the first base portion 11, and a plurality of second finger electrode portions 22 which extend respectively from the second base portion 21, and which are arranged to be interdigitated with the first finger electrode portions 12. Two adjacent ones of the first and second finger electrode portions 12, 22 are spaced apart from each other by a first distance (d) ranging from 0.5 mm to 20 mm. Each of the first and second finger electrode portions 12, 22 is spaced apart from a respective one of the second and first base portions 21, 11 by a second distance (a). A ratio of the second distance (a) to the first distance (d) is larger than 0.8.

In certain embodiments, the flexible conductive heating device may include a plurality of the first electrode units 10 which are electrically connected to each other in parallel.

The flexible conductive heating device is prepared by the following steps a) to d).

In step a), the components in the conductive heating composition are evenly mixed.

In step b), the conductive heating composition is melt-blended and then granulated into composite pellets. The composite pellets may be formed by introducing the conductive heating composition into an extruder/granulator, such as a twin screw extruder (Leistritz ZSE 27 MAXX, screw L/D=42). The obtained composite pellets are then homogeneously mixed in a tank for 20 minutes.

In step c), the flexible conductive heating substrate 100 is formed using the composite pellets through an extrusion process. The composite pellets may be extruded as the flexible conductive heating substrate 100 using a single-screw extruder (Labtech Engineering, LCR-350-HD, screw L/D=30). The extruder has an extrusion die of 0.1 mm, and is operated at a line speed of 0.8 m/min.

In step d), the at least one first electrode unit 10 is formed on the first major surface 3 of the flexible conductive heating substrate 100. The step d) may be implemented by hot pressing a metal foil (not shown) on the first major surface 3 of the flexible conductive heating substrate 100 to form a metal layer on the first major surface 3, and patterning the metal layer to form the first electrode unit 10.

In certain embodiments, a nickel coated copper foil is mounted on the flexible conductive heating substrate 100 by the hot pressing process followed by a cold pressing process to form a copper clad laminate. Thereafter, the copper layer on the laminate is patterned to form the first electrode unit 10.

In certain embodiments, the first electrode unit 10 may be formed on the flexible conductive heating substrate 100 by screen printing a conductive paste or glue (such as not limited to a silver paste) on the first major surface 3.

Figure 6:
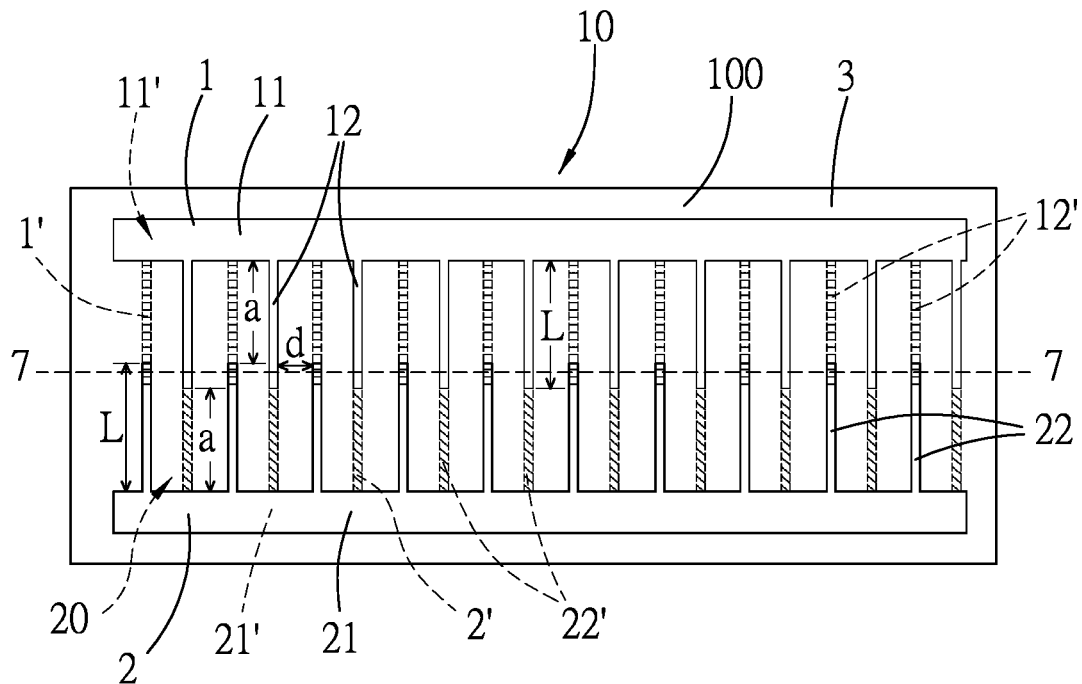
FIG. 6 illustrates a schematic top view of a flexible conductive heating device according to a second embodiment of the disclosure.
Figure 7:
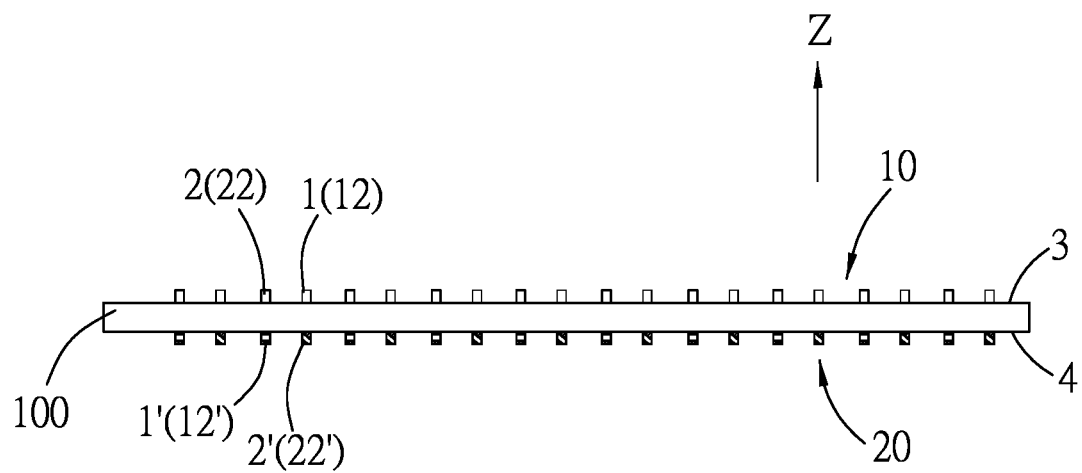
FIG. 7 is a cross-sectional view taken along line 7-7 of FIG. 6.

FIGS. 6 and 7 illustrate a flexible conductive heating device according to a second embodiment of the disclosure. The second embodiment is similar to the first embodiment except that in the second embodiment, the flexible conductive heating device further includes at least one second electrode unit 20 which is formed on the second major surface 4, and which includes a positive electrode 1' and a negative electrode 2'. The positive electrode 1' includes a first base portion 11' and a plurality of first finger electrode portions 12'. The negative electrode 2' includes a second base portion 21', which is spaced apart from the first base portion 11', and a plurality of second finger electrode portions 22' which are arranged in interdigitated relationship with the first finger electrode portions 12'. Each of the first finger electrode portions 12 of the positive electrode 1 of the first electrode unit 10 is overlapped with a respective one of the second finger electrode portions 22' of the negative electrode 2' of the second electrode unit 20 in the thickness direction (Z) by at least 10 percent area. Each of the second finger electrode portions 22 of the negative electrode 2 of the first electrode unit 10 is overlapped with a respective one of the first finger electrode portions 12' of the positive electrode 1' of the second electrode unit 20 in the thickness direction (Z) by at least 10 percent area.

In certain embodiments, the flexible conductive heating device may include a plurality of the first electrode units 10 which are electrically connected to each other in parallel, and a plurality of the second electrode units 20 which are electrically connected to each other in parallel.

Figure 8:
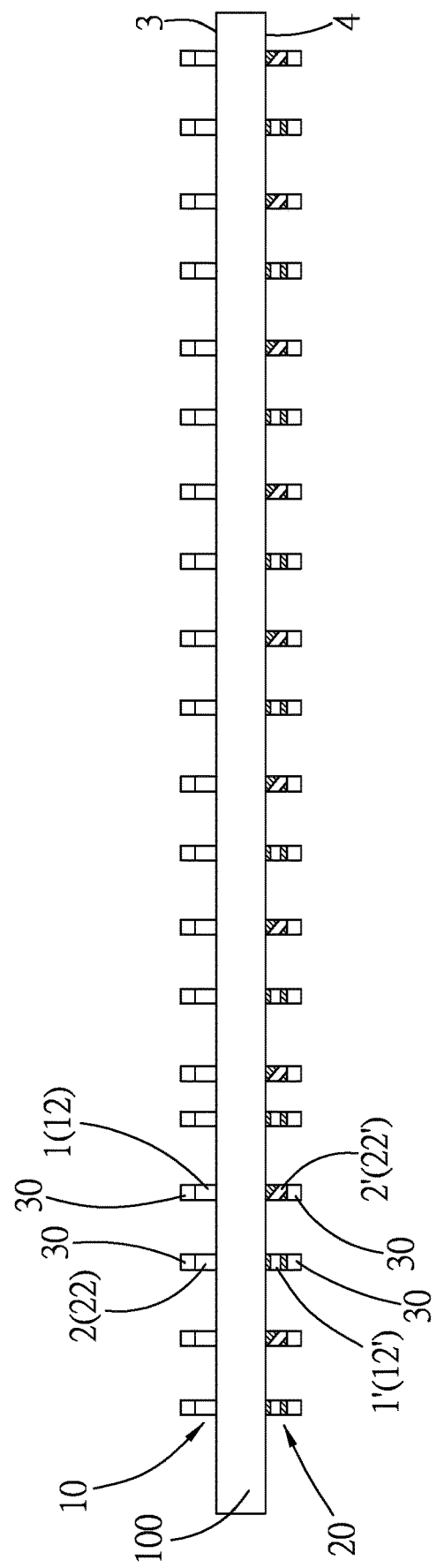
FIG. 8 is a cross-sectional view of a flexible conductive heating device according to a third embodiment of the disclosure.

FIG. 8 illustrates a flexible conductive heating device according to a third embodiment of the disclosure. The third embodiment is similar to the second embodiment except that in the third embodiment, each of the positive and negative layers 1, 1', 2, 2' is coated with a layer 30 made of an insulating or thermal conductive material.

Figure 9:
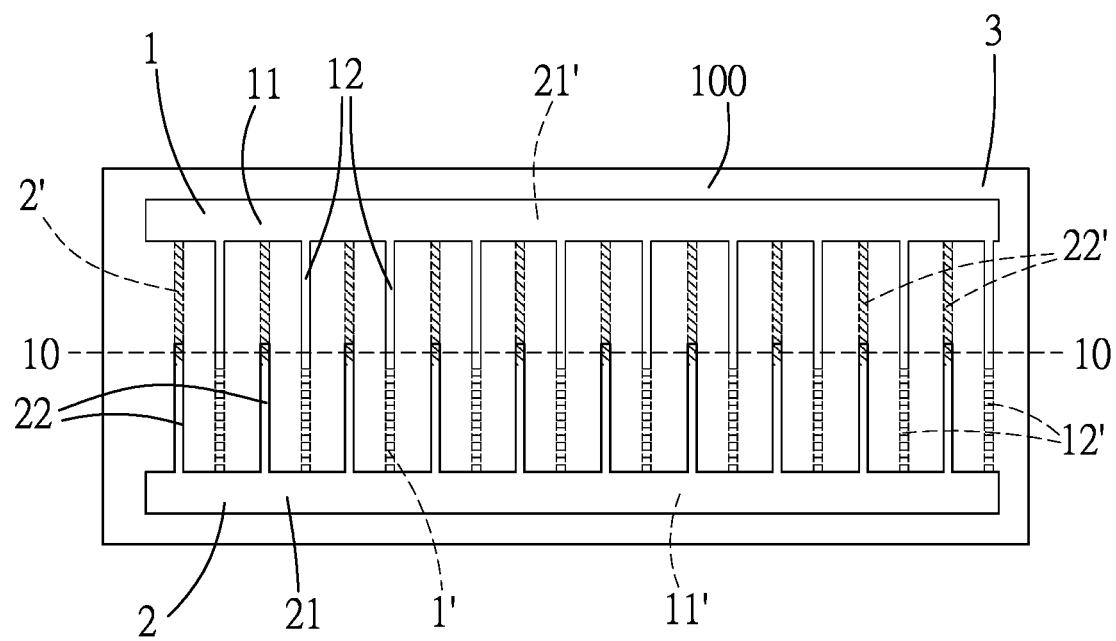
FIG. 9 illustrates a schematic top view of a flexible conductive heating device according to a fourth embodiment of the disclosure.
Figure 10:
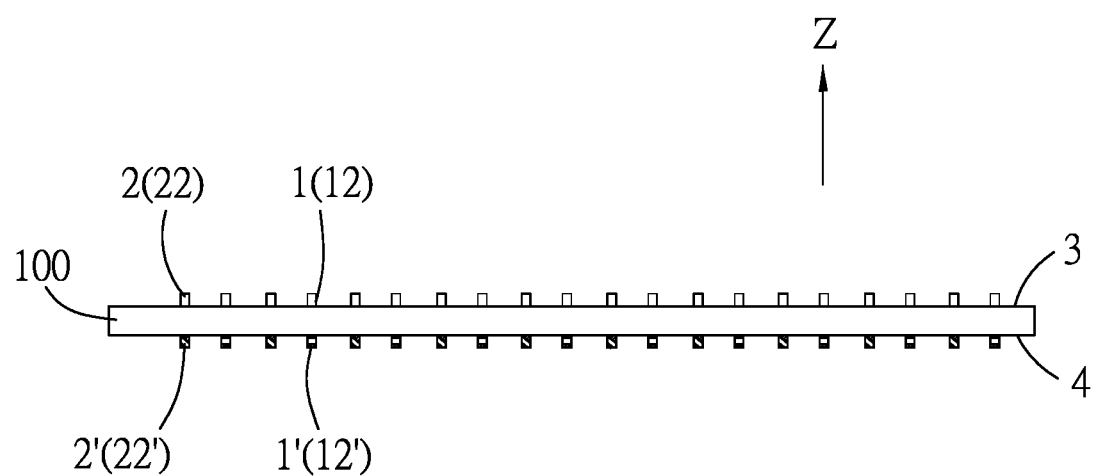
FIG. 10 is a cross-sectional view taken along line 10-10 of FIG. 9.

FIGS. 9 and 10 illustrate a flexible conductive heating device according to a fourth embodiment of the disclosure. The fourth embodiment is similar to the second embodiment except that in the fourth embodiment, each of the first finger electrode portions 12 of the positive electrode 1 of the first electrode unit 10 is overlapped with a respective one of the first finger electrode portions 12' of the positive electrode 1' of the second electrode unit 20 in the thickness direction (Z) by at least 10 percent area. In addition, Each of the second finger electrode portions 22 of the negative electrode 2 of the first electrode unit 10 is overlapped with a respective one of the second finger electrode portions 22' of the negative electrode 2' of the second electrode unit 20 in the thickness direction (Z) by at least 10 percent area.

The embodiments of the disclosure will now be explained in more detail below by way of the following examples and comparative examples. Those examples are intended for purposes of illustration only and are not intended to limit the scope of the present disclosure.

First Experiment—Basic Properties

Example 1 (EX 1)

4500 g of a polyolefin elastomer (ethylene-octene copolymer purchased from LG chemical, Model: Lucene LC 170, melting point: 100° C., shore A: 91), 1000 g of high-density polyethylene (HDPE) (purchased from LyondellBasell, Model: Petrothene LB832001, melting point: 135° C.), 500 g of ethylene vinyl acetate copolymer (EVA) (purchased from Du Pont, Model: Elvax 760, melting point: 100° C.), 3000 g of carbon black (purchased form Spring Green Corp., Model: AS-32, mean particle size: 31 nm, DBP (dibutyl phthalate value): 72 cc/100 g), and 1000 g of calcium carbonate (purchased from Specialty minerals Inc., Model: Calcium meal 30, average particle size: 200 mesh, purity: greater than 98%) were poured into a container and evenly mixed at 25° C. for 20 minutes to obtain a premixed conductive composition powder of EX 1. The weight percents of the components in the conductive composition powder of EX 1 were listed in the following Table 1.

Example 2 (EX 2)

A conductive composition of EX 2 was prepared according to the process employed for preparing the composition of EX 1, except that in EX 2, 4500 g of ethylene-propylene copolymer (purchased from Mitsui Chemicals, Model: TAF-MER™ BL2491M, melting point: 100° C., shore A: 57) replaces the polyolefin elastomer of EX 1. The weight percents of the components in the premixed conductive composition powder of EX 2 were listed in Table 1.

Example 3 (EX 3)

A conductive composition of EX 3 was prepared according to the process employed for preparing the composition of EX 1, except that in EX 3, the ethylene-octene copolymer (4500 g) was purchased from Dow Chemicals (Model: Engage 8200, melting point: 59° C., shore A: 66). The weight percents of the components in the premixed conductive composition powder of EX 3 were listed in Table 1.

Example 4 (EX 4)

A conductive composition of EX 4 was prepared according to the process employed for preparing the composition of EX 2, except that in EX 4, the ethylene-1-butene copolymer (4500 g) was purchased from purchased from LG chemical (Model: Lucene LC 175, melting point: 42° C., shore A: 63). The weight percents of the components in the premixed conductive composition powder of EX 4 were listed in Table 1.

Comparative Example 1 (CE1)

A conductive composition of CE 1 was prepared according to the process employed for preparing the composition of EX 1, expect that in CE 1, the polyolefin elastomer was not added. The conductive composition powder of CE 1 had ingredients similar to a conventional one. The weight percents of the components in the conductive composition powder of CE 1 were listed in Table 1.

Comparative Example 2 (CE2)

A conductive composition of CE 2 was prepared according to the process employed for preparing the composition of EX 1, expect that in CE 2, the polyolefin elastomer was replaced with a thermoplastic elastomer purchased from Dow Chemical (Model: NORDEL™ EPDM 3722P, shore hardness: 71 A). The weight percents of the components in the conductive composition powder of CE 2 were listed in Table 1.

Preparation of Composite Pellets

The conductive composition of each of EX 1 to EX 4, CE 1, and CE 2 was introduced into a twin screw extruder (Leistritz ZSE 27 MAXX, screw L/D=42). The twin screw extruder was operated at a screw speed of 120 rpm and a barrel temperature of about 240° C. with a 4 mm die and pelletizer to form composite pellets.

Preparation of Specimens

The composite pellets made of the conductive composition of each of EX 1 to EX 4, CE 1, and CE 2 were homogeneously mixed in a tank for 20 minutes, and then molded and extruded as a substrate using a single-screw extruder (Labtech Engineering, LCR-350-HD, screw L/D=30). The extruder had an extrusion die of 0.1 mm, was operated at a line speed of 0.8 m/min, a screw speed of 30 rpm and 235° C. Finally, the substrate was cut into a plurality of first specimens (200 mm×200 mm) and a plurality of second specimens (100 mm×35 mm).

First Test—Surface Resistivity

For testing the composition of EX 1, two electrodes were formed in one of the first specimens made of the composition of EX 1. Each of the electrodes had an electrode length (EL) of 10 cm, and the electrodes were spaced apart by a spaced distance (SD) of 1.5 cm.

A surface resistance of the first specimen made of the composition of EX 1 was measured using a resistance meter (HIOKI RM3544-01). The value of the surface resistance was shown on the resistance meter. A surface resistivity was calculated according to the following equation:

$$\text{Surface resistance} = \text{Surface resistivity} \times EL \div SD$$

Surface resistances and surface resistivities of the first specimens made of the compositions EX 2 to EX 4, CE 1, and CE 2 were also measured and calculated, respectively. The results were listed in Table 1.

Second Test—Volume Resistivity

Two metal foils (nickel coated copper foils purchased from Fukuda, Model: NIMT-CF, thickness: 0.035 mm) were respectively attached to two opposite surfaces of another first specimen made of the composition of EX 1, and then the first specimen with the two foil layers was disposed between two hot pressing plates, preheated for 3 minutes (10 psi, 200° C.), and hot-pressed for 5 minutes (100 psi) to obtain a laminate. The laminate was further subjected to a cool-pressing process (25° C., 100 psi) for 5 minutes. The laminate was cut into a test piece with an effective electrically conductive surface area (A) of 9 cm$^2$ (30 mm×30 mm). A thickness (T) of the test piece was measured using a Caliper (Mitutoyo 500-196-30). A resistance of the test piece was measured in a thickness direction using a resistance meter (HIOKI RM3544-01). The value of the resistance was shown on the resistance meter. A volume resistivity was calculated according to the following equation:

$$\text{Volume resistivity} = \text{Resistance} \times A \div T$$

Test pieces were also prepared from other first specimens of EX 2 to EX 4, CE 1, and CE 2, and resistances and volume resistivities for those test pieces were also measured and calculated, respectively. The results were listed in Table 1.

TABLE 1

| Item | EX 1 | EX 2 | EX 3 | EX 4 | CE 1 | CE2 |
|---|---|---|---|---|---|---|
| Polyolefin elastomer (wt %) | 45 | 45 | 45 | 45 | — | — |
| Thermoplastic elastomer (wt %) | — | — | — | — | — | 45 |
| HDPE (wt %) | 10 | 10 | 10 | 10 | 40 | 10% |
| EVA (wt %) | 5 | 5 | 5 | 5 | 20 | 5 |
| Carbon black (wt %) | 30 | 30 | 30 | 30 | 30 | 30 |
| Calcium carbonate (wt %) | 10 | 10 | 10 | 10 | 10 | 10 |
| Surface Resistivity (surface area: 400 cm$^2$) | | | | | | |
| Surface resistance (ohm) | 225 | 1956 | 12135 | 28596 | 5 | 325895 |
| Surface resistivity (ohm) | 2E.+03 | 1E.+04 | 8E.+04 | 2E.+05 | 3E.+01 | 2E.+06 |

TABLE 1-continued

| Item | EX 1 | EX 2 | EX 3 | EX 4 | CE 1 | CE2 |
|---|---|---|---|---|---|---|
| Volume Resistivity (effective conductive area: 9.0 cm$^2$) | | | | | | |
| Thickness (cm) | 0.025 | 0.027 | 0.018 | 0.018 | 0.015 | 0.032 |
| Resistance (ohm) | 0.950 | 1.560 | 16.350 | 150.000 | 0.008 | 1500.000 |
| Volume resistivity (ohm-cm) | 3.E+02 | 5.E+02 | 8.E+03 | 8.E+04 | 5.E+00 | 4.E+05 |

Third Test–Temperature Versus Resistance Curve Measurement

Figure 11:
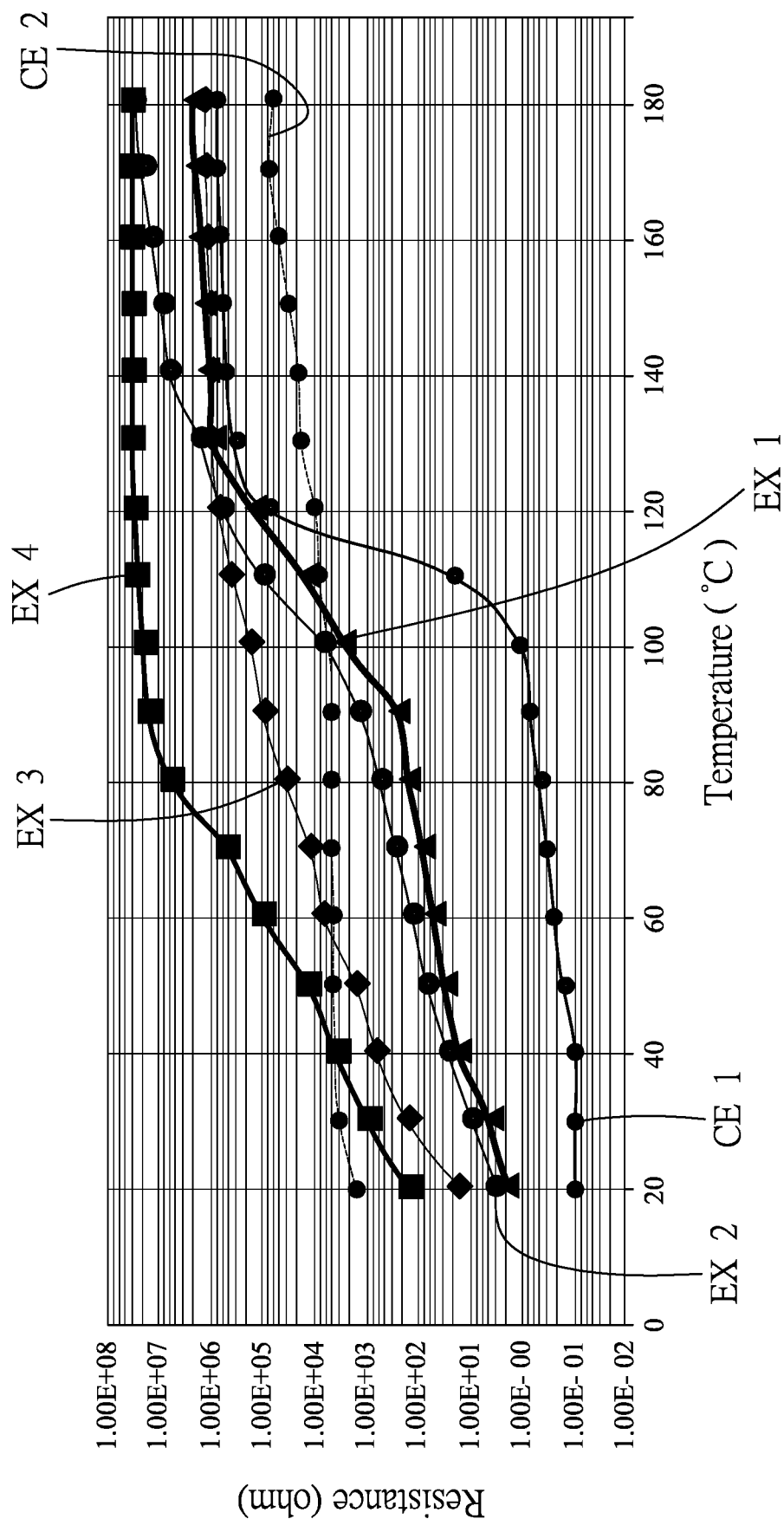
FIG. 11 is a temperature versus resistance graph for materials prepared in a first experiment.

Test pieces for the compositions of EX 1 to EX 4, CE 1, and CE 2 were prepared by a process similar to the process employed for preparing the test pieces of the second test. Resistances of the test pieces were measured at 20° C. using a resistance meter (KIOKI RM3544-01). Thereafter, the test pieces were placed in an oven for heating the test piece at a rate of 2° C./min. Resistances of the test piece were further measured each time when the temperature was raised by 10° C. until the temperature reached to 180° C. The results were shown in FIG. 11

In the temperature interval between 20° C. and 90° C., a log value of the resistance of the test piece of each of EX 1 to EX 4, CE 1, and CE 2 increased with a slope which was calculated according to the following equation:

$$\text{Slope} = \frac{\log(R90) - \log(R20)}{90° \text{ C.} - 20° \text{ C.}}$$

where R90 and R20 represent the resistances of the test pieces at 90° C. and 20° C., respectively.

The calculated slopes were listed in Table 2.

TABLE 2

| Item | EX 1 | EX 2 | EX 3 | EX 4 | EX 5 | EX 6 |
|---|---|---|---|---|---|---|
| Slope | 3.77E−02 | 3.77E−02 | 5.39E−02 | 8.68E−02 | 1.29E−02 | 6.97E−03 |

Fourth Test—Bending Characteristics

Before testing, surface resistances of second specimens made of the compositions of EX 1 to EX 4, CE 1, and CE 2 were measured using a surface resistance meter (HIOKI RM3544-01). Each of the second specimens was set in a De-mattia crack tester and repeatedly subjected to continuous tensile strain by a chuck distance of 57 mm and a stroke of 100 mm 300 times, according to the ISO 132/1999 procedure. After testing, surface resistances of specimens were further measured. The test results were listed in Table 3.

TABLE 3

| Item | EX 1 | EX 2 | EX 3 | EX 4 | CE 1 | CE 2 |
|---|---|---|---|---|---|---|
| Before test surface resistance (ohm) | 225 | 1956 | 12135 | 28596 | 5.3 | 325895 |
| Appearance | No damage | No damage | No damage | No damage | Damaged | No damage |
| After test surface resistance (ohm) | 1128 | 3698 | 28653 | 63589 | N/A | 3658900 |
| Increased rate* | 401% | 89% | 136% | 122% | N/A | 1023% |

$${}^{*}\text{Increased rate} = \frac{\text{After test surface resistance} - \text{Before test surface resistance}}{\text{Before test surface resistance}} \times 100\%$$

*N/A: not available

It can be found from Table 3 that although the composition CE 1, a well known PTC behavior polymer composition and without elastomer therein (see Table 1), was broken during bending test due to its high crystalline property. Furthermore, although the composition CE 2 which included thermoplastic elastomer was not damaged in the measurement according to ISO 132/1999 procedure, the resistance of the composition CE 2 did not sharply increase with the increasing temperature (see FIG. 11). In addition, after the measurement according to ISO 132/1999 procedure, the carbon black in the composition of CE 2 appeared to shift to cause the surface resistance greatly increase (increased rate: 1023%). Therefore, the compositions EX 1 to EX 4 including (i) a polyolefin elastomer, (ii) a crystalline non-grafted polyolefin (HDPE), (iii) a crystalline polymer which is grafted or copolymerized with a monomeric unit selected from carboxylic acid, carboxylic acid derivatives, and combinations thereof (EVA), and (iv) conductive filler (carbon black) may have better bending characteristics, and lower increased rate in the surface resistance after repeated subjected to the measurement according to ISO 132/1999 procedure 300 times.

Second Experiment—Aging Test

Example 1A (EX 1A)

A flexible conductive heating device of EX 1A was prepared according to the first embodiment shown in FIGS. 4 and 5, except that the flexible conductive heating device of EX 1A included ten of the first electrode units 10 which were parallel-connected. In EX 1A, the flexible conductive heating substrate 100 was made of the composition EX 1, and each of the first and second major surfaces 3, 4 had a surface area of 90.7 cm$^2$ (75 mm×121 mm). The first electrode units 10 were formed on the flexible conductive heating substrate 100 by screen-printing a silver paste on the first major surface 3. In addition, the positive electrode 1 of each of the first electrode units 10 included ten of the first finger electrode portions 12, and the negative electrode 2 of each of the first electrode units 10 included ten of the second finger electrode portions 22. The length (L) of each of the first and second finger electrode portions 12, 22, the first distance (d), and the second distance (a) shown in FIG. 4 were listed in Table 4 below.

Example 1A' (EX 1A'), Examples 2A to 4A (EX 2A to 4A) and Comparative Example 1A (CE 1A)

Flexible conductive heating devices of EX 1A', EX 2A to 4A, and CE 1A were prepared to be similar to the flexible conductive heating device of EX 1A, except for the material for forming the flexible conductive heating substrate 100, and the parameters for the first electrode unit(s), i.e., the length (L) of each of the first and second finger electrode portions 12, 22, the first distance (d), the second distance (a), the ratio (a/d), and the number of the first electrode unit(s) 10, which were listed in Table 4.

Each of the flexible conductive heating devices of EX 1A, EX 1A', EX 2A to 4A and CE 1A was subjected to an aging test by applying a test voltage (listed in Table 4) to the respective flexible conductive heating device for 1000 hours, and the resistance for each flexible conductive heating device was measured before and after the aging test. The results were also listed in Table 4.

TABLE 4

| Item Material | EX 1A EX 1 | EX 1A' EX 1 | EX 2A EX 2 | EX 3A EX 3 | EX 4A EX 4 | CE 1A CE 1 |
|---|---|---|---|---|---|---|
| Size of each of the first and second major surfaces | | | | | | |
| Length (mm) | 75 | 260 | 160 | 880 | 520 | 206 |
| Width (mm) | 121 | 125 | 125 | 140 | 190 | 190 |
| Surface area | 90.75 | 325 | 200 | 1232 | 988 | 391.4 |
| Parameters for the first electrode unit(s) | | | | | | |
| d (mm) | 0.5 | 10.0 | 5.0 | 20.0 | 10.0 | 100.0 |
| L (mm) | 100 | 100 | 100 | 100 | 150 | 150 |
| a (mm) | 0.45 | 5.00 | 5.00 | 20.00 | 20.00 | 20.00 |
| a/d | 0.90 | 0.50 | 1.00 | 1.00 | 2.00 | 0.20 |
| Electrode unit number* | 10 | 10 | 10 | 20 | 20 | 1 |
| Parameters and results for aging test | | | | | | |
| Test voltage (volt) | 5 | 12 | 48 | 250 | 250 | 48 |
| Test period (hour) | 1000 | 1000 | 1000 | 1000 | 1000 | 1000 |
| Surface resistivity (ohm) | 2.E+03 | 2.E+03 | 1.E+04 | 8.E+04 | 9.E+05 | 3.E+01 |
| Before test resistance (ohm) | 1.13 | 18.00 | 71.72 | 687.65 | 590.98 | 33.33 |
| After test resistance (ohm) | 1.72 | 191.70 | 168.54 | 1155.25 | 1170.15 | 28533.33 |
| Increased rate* | 53% | 965% | 135% | 68% | 98% | 85500% |

*Electrode unit number: number of the first electrode unit(s)

$$\text{*Increased rate} = \frac{\text{After test resistance} - \text{Before test resistance}}{\text{Before test surface resistance}} \times 100\%$$

During the aging test, "hot-lines" were found in the flexible conductive heating device of CE 1A. Although the device CE 1A was still operable in the test, the increased rate in the resistance, after the voltage was applied for 1000 hours, reached to 85500%. This is because of the uneven heat distribution in the flexible conductive heating device CE 1A. In this case, polymer structures in higher temperature zones of the flexible conductive heating substrate may be seriously destroyed, making the resistance in those zones undue large, thereby forming the "hot lines" which are likely formed between the positive and negative electrodes to be connected in series.

Furthermore, it can be found that when the ratio (a/d) was ranged from 0.8 to 2 (especially, from 0.9 to 1.0), the increased rate in the resistance, after the voltage was applied for 1000 hours, was relatively small. This is because when the first finger electrode portions 12 are closer to the second base portion 21, the point discharge phenomenon becomes manifest. This means the current can be evenly flow between the positive and negative electrodes. Therefore, it can be concluded that when the ratio (a/d) is greater than 0.8, especially when the ratio (a/d) ranges from 0.8 to 2.0, more even heat distribution in the flexible conductive heating device may be achieved, thereby alleviating the problems caused by the formation of "hot-lines" in the flexible conductive heating device.

Third Experiment

Example 5 to Example 8 (EX 5 to 8)

Each of conductive heating compositions of EX 5 to 8 was prepared according to the process employed for preparing the composition of EX 2 in the first experiment, except for the weight percents of the components which were listed in the following Table 5.

First and second specimens for each of the compositions of EX 5 to 8 were prepared in the same manner described in the first experiment. The compositions of EX 5 to 8 were subjected to tests for Surface Resistivity, Volume Resistivity, Temperature versus Resistance Curve Measurement, and Bending Characteristics, as described in the first experiment. The results were shown in Table 5 and in FIG. 12.

TABLE 5

| Item | EX 5 | EX 6 | EX 7 | EX 8 |
|---|---|---|---|---|
| Polyolefin elastomer* (wt %) | 49 | 39 | 15 | 10 |
| HDPE (wt %) | 10 | 10 | 22 | 25 |
| EVA (wt %) | 5 | 5 | 23 | 25 |
| Carbon black (wt %) | 26 | 36 | 30 | 30 |
| Calcium carbonate (wt %) | 10 | 10 | 10 | 10 |
| Surface Resistivity (surface area: 400 cm$^2$) | | | | |
| Surface resistance (ohm) | 158600 | 8.6 | 1284 | 589 |
| Surface resistivity (ohm) | 1.E+06 | 6.E+01 | 9.E+03 | 4.E+03 |
| Volume Resistivity (effective conductive area: 9.0 cm$^2$) | | | | |
| Thickness (cm) | 0.021 | 0.032 | 0.015 | 0.015 |
| Resistance (ohm) | 153.000 | 0.300 | 0.930 | 0.870 |
| Volume resistivity (ohm-cm) | 7.E+04 | 8.E+01 | 6.E+02 | 5.E+02 |
| Temperature versus Resistance Curve Measurement | | | | |
| Slope (ohm/° C.) | 5.19E+02 | 6.62E+02 | 5.69E+02 | 5.17E+02 |
| Bending characteristics | | | | |
| Before test surface resistance (ohm) | 158600.0 | 8.6 | 1284.0 | 589.0 |
| Appearance | No damaged | No damaged | No damaged | No damaged |
| After test surface resistance (ohm) | 356820.0 | 30.7 | 2858.0 | 2325.0 |
| Increased rate* | 125% | 257% | 123% | 295% |

*Polyolefin elastomer: ethylene-propylene copolymer (purchased from Mitsui Chemicals, Model: TAFMER™ BL2491M, melting point: 100° C., shore A:57)

$$*\text{Increased rate} = \frac{\text{After test surface resistance} - \text{Before test surface resistance}}{\text{Before test surface resistance}} \times 100\%$$

Figure 12:
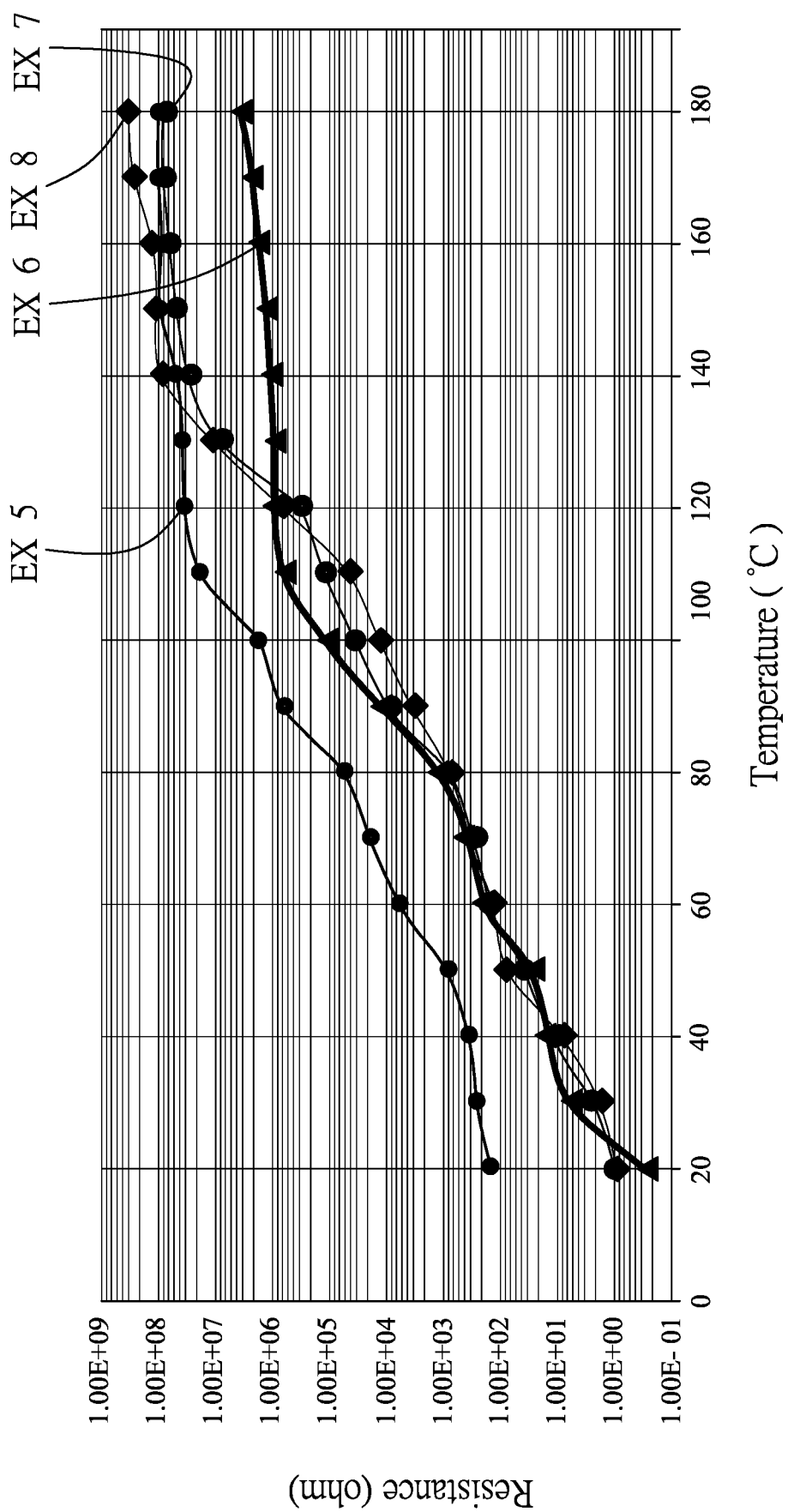
FIG. 12 is a temperature versus resistance graph for materials prepared in a third experiment.

Because the polyolefin elastomer (which is provided with crystalline property) and the crystalline non-grafted polyolefin in the compositions of EX 5 to EX 8 have good compatibility therebetween, the compositions of EX 5 to EX 8, as shown in Table 5 and FIG. 12, had good mechanical and electrical properties, and self-limiting and regulating properties.

Examples 5A to 8A (EX 5A to 8A)

Flexible conductive heating devices of EX 5A to 8A were prepared to be similar to the flexible conductive heating device of EX 1A, except for the material for forming the flexible conductive heating substrate 100, and the parameters for the first electrode unit(s), i.e., the length (L) of each of the first and second finger electrode portions 12, 22, the first distance (d), the second distance (a), the ratio (a/d), and the number of the first electrode unit(s) 10, which were listed in Table 6.

Each of the flexible conductive heating devices of EX 5A to 8A was subjected to the aging test described in the second experiment, and the results were also shown in Table 6.

In addition, each of the flexible conductive heating devices of EX 5A to 8A was further subjected to a self temperature limiting test according to UL standard 1434 11.6 by applying a voltage of 12 Vdc at 25° C. Maximum surface temperature and maximum residual current of each test were also recorded in Table 6. A test result of EX 6A was also shown in FIG. 13.

Furthermore, EX 6A was further tested according to UL standard 1434 11.6 by applying a voltage of 12 Vdc under an ambient temperature (AT=30° C.) and a lower ambient temperature (AT=−20° C.). The results was shown in FIG. 14.

TABLE 6

| Item | EX 5A | EX 6A | EX 7A | EX 8A |
|---|---|---|---|---|
| Material | EX 5 | EX 6 | EX 7 | EX 8 |
| Parameters for the first electrode units | | | | |
| d (mm) | 2.5 | 18.0 | 0.5 | 0.5 |
| L (mm) | 80 | 50 | 80 | 80 |
| a (mm) | 5.00 | 15.00 | 0.50 | 3.00 |
| a/d | 2.00 | 0.83 | 1.00 | 6.00 |
| Electrode unit number* | 45 | 8 | 20 | 6 |
| Parameters and results for aging test | | | | |
| Test voltage (volt) | 250 | 12 | 12 | 12 |
| Test period (hour) | 1000 | 1000 | 1000 | 1000 |
| Max. surface temperature (° C.) | 46.3 | 75.4 | 56.7 | 64.3 |
| Max. residual current (A) | 0.02 | 0.19 | 0.09 | 0.11 |
| Surface resistivity (ohm) | 1.E+06 | 6.E+01 | 9.E+03 | 4.E+03 |
| Before test resistance (ohm) | 1041.67 | 3.24 | 3.09 | 3.54 |
| After test resistance (ohm) | 3072.92 | 8.59 | 22.74 | 23.66 |
| Increased rate* | 195% | 165% | 635% | 568% |

*Electrode unit number: the number of the first electrode units $$*\text{Increased rate} = \frac{\text{After test resistance} - \text{Before test resistance}}{\text{Before test surface resistance}} \times 100\%$$

It can be found from Table 6 that when the same voltage (12 Vdc) was applied to the flexible conductive heating devices of EX 6A to EX 8A, the flexible conductive heating devices of EX 6A and 8A had relatively large increased rate in the resistance (i.e., relatively large aging rate). This is because that the compositions EX 7 and EX 8 used in EX 7A and EX 8A had relatively low concentrations of carbon black and polyolefin elastomer, and relatively high concentrations of HDPE which may be destroyed during the aging test. Therefore, the polyolefin elastomer may be in an amount ranging from 10 wt % to 50 wt %, preferably greater than 15 wt % to 50 wt %, and more preferably 39 wt % to 50 wt % based on 100 wt % of a total weight of the conductive composition.

Figure 13:
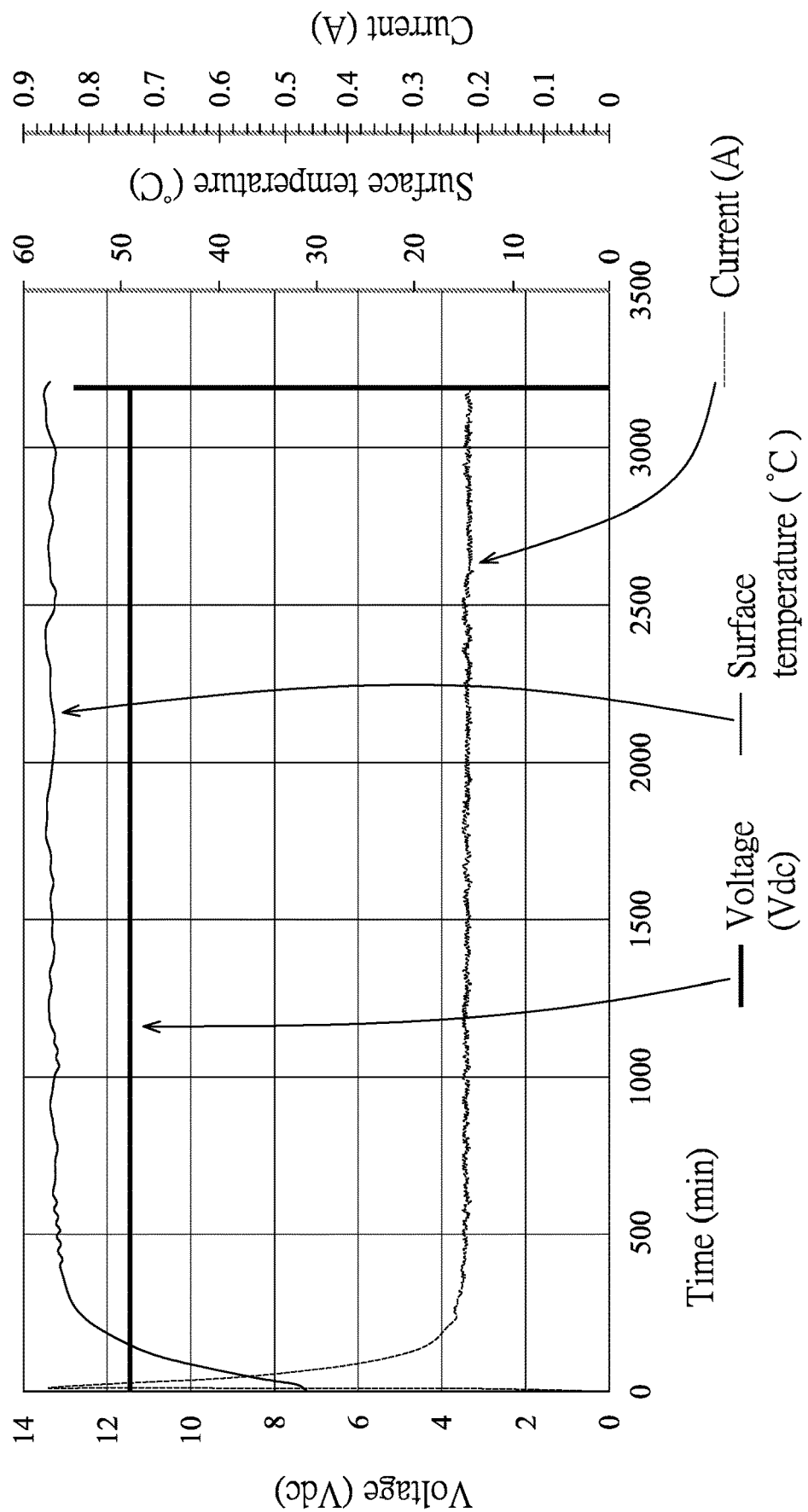
FIG. 13 illustrates a result of a self temperature limiting test for a composition of Example 6A (EX 6A)

It can be found in FIG. 13 that after the voltage (12 Vdc) was applied for 500 minutes, the surface temperature was kept at a small range (about 55-60° C.), and the current was also kept at about 0.22 A. Therefore, the flexible conductive heating device of EX 6A had self temperature limiting property.

Figure 14:
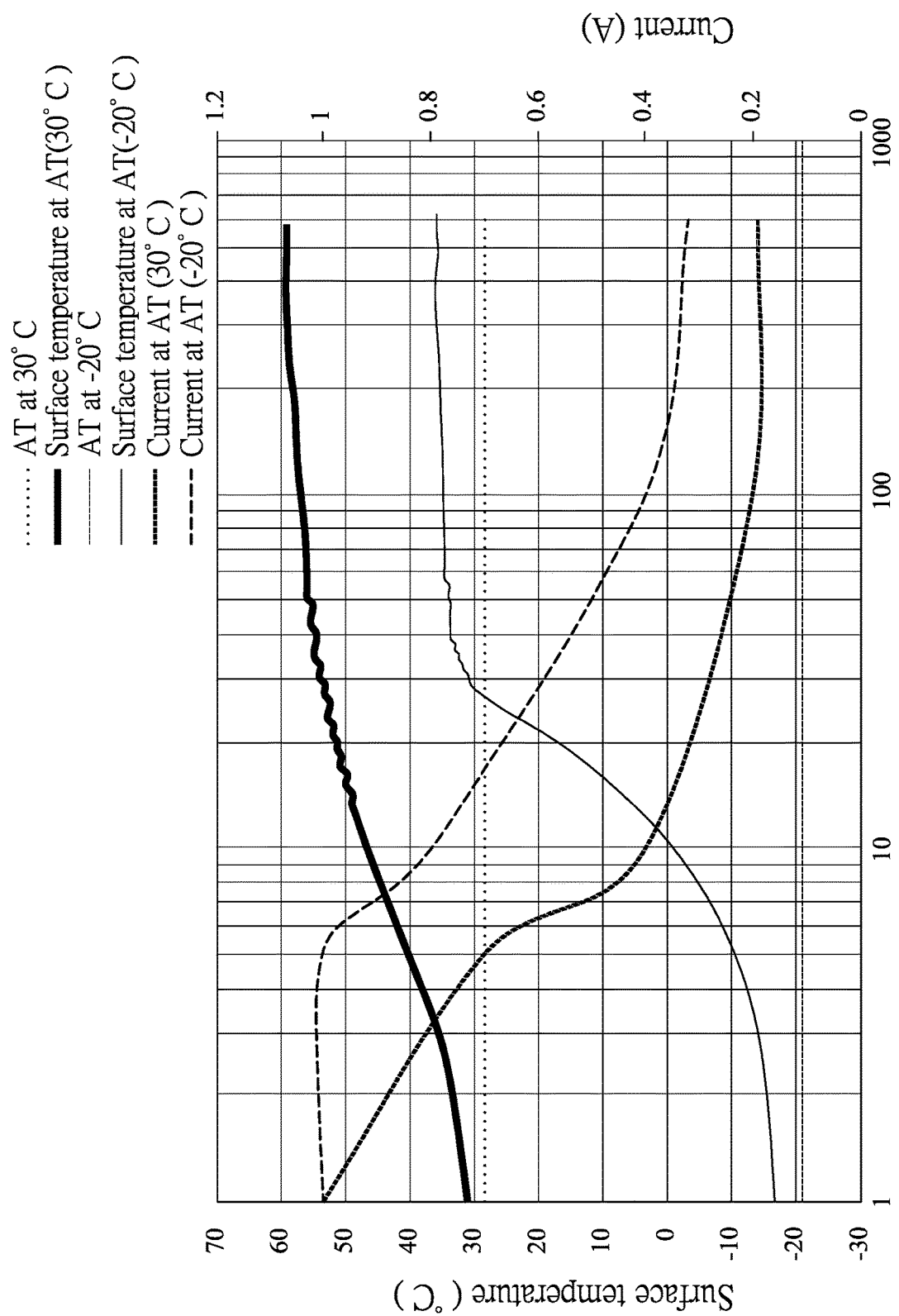
FIG. 14 illustrates a result of a self current regulation test for the composition EX 6A under higher and lower ambient temperatures.

It can be found in FIG. 14 that the flexible conductive heating device of EX 6A may self regulate the current passing therethrough under different ambient temperatures so as to compensate for the ambient temperature.

Fourth Experiment

Example 1B (EX 1B)

A flexible conductive heating device of EX 1B was prepared according to the second embodiment shown in FIGS. 6 and 7, except that the flexible conductive heating device of EX 1B included ten of the first electrode units 10 which were parallel-connected and ten of the second electrode units 20 which were parallel-connected. In EX 1B, the flexible conductive heating substrate 100 was made of EX 1. The first and second electrode units 10, 20 were formed on the flexible conductive heating substrate 100 by screen-printing a silver paste on the first and second major surfaces 3, 4, respectively. In addition, each of the positive electrodes 1, 1' of the first and second electrode units 10, 20 included ten of the first finger electrode portions 12, 12', and each of the negative electrodes 2, 2' of the first and second electrode units 10, 20 included ten of the second finger electrode portions 22, 22'. The length (L) of each of the first and second finger electrode portions 12, 12', 22, 22', the first distance (d), and the second distance (a) shown in FIG. 6 were listed in the following Table 7. In addition, the number of the first electrode units 10 which is equal to the number of the second electrode units 20, an overlapping area of the first and second electrode units 10, 20 in the thickness direction (Z) shown in FIG. 7, and a total surface area of the first electrode units 10, which is equal to a total surface area of the second electrode units 20, were also listed in Table 7.

Example 2B (EX 2B)

Flexible conductive heating device of EX 2B was prepared as similar as EX 1B, except for the material for forming the flexible conductive heating substrate 100, and the parameters for the first electrode unit(s), i.e., the first distance (d), the second distance (a), the ratio (a/d), and the overlapping area, which were listed in Table 7.

TABLE 7

| Item<br>Material | EX 1B<br>EX 1 | EX 2B<br>EX 2 |
|---|---|---|
| Parameters for the first/second electrode units | | |
| Thickness* (mm) | 0.25 | 0.27 |
| d (mm) | 0.5 | 5.0 |
| L (mm) | 100 | 100 |
| a(mm) | 0.45 | 5.00 |
| a/d | 0.90 | 1.00 |
| Electrode unit number* | 10 | 10 |
| Total surface area of the electrode units* (cm$^2$) | 20 | 20 |
| Overlapping area* | 10 | 9.3 |
| Overlapping ratio* | 50 | 46.50 |
| Volume resistivity (ohm-cm) | 342 | 520 |
| Parameters and results for aging test | | |
| Test voltage (volt) | 5 | 48 |
| Test period (hour) | 1000 | 1000 |
| Before test resistance (ohm) | 0.94 | 2.25 |
| After test resistance (ohm) | 3.02 | 7.53 |
| Increased rate* | 221% | 235% |

*Thickness: a thickness of the flexible conductive heating device
*Electrode unit number: the number of the first electrode units, which is equal to the number of the second electrode units
*Total surface area of the electrode units: a total surface area of the first electrode units, which is equal to a total surface area of the second electrode units
*Overlapping area: an overlapping area of the first and second electrode units 10, 20 in the thickness direction (Z) shown in Fig. 7

$$*\text{Overlapping ratio} = \frac{\text{Overlapping area}}{\text{Total surface area of the electrode units}} \times 100\%$$

$$*\text{Increased rate} = \frac{\text{After test resistance} - \text{Before test resistance}}{\text{Before test resistance}} \times 100\%$$

With the provision of the first and second electrode units 10, 20 on the first and second major surfaces 3, 4 of the flexible conductive heating substrate 100, the temperature differences between the first and second major surfaces 3, 4 may be reduced. The current may be forced to flow in the thickness direction (Z) and an in-plane direction. Therefore, the flexible conductive heating devices of EX 1B and EX 2B may have more even heat distribution.

When the flexible conductive heating device of the disclosure is heated from 20° C. to 90° C., a log value of a resistance of the conductive heating composition increases with a slope ranging from 3E−02 log ohm/° C. to 9E−02 log ohm/° C. This means that in temperature ranging from 20° C. to 90° C., the resistance of the flexible conductive heating device may be varied by variation of the applied voltage so as to permit the flexible conductive heating device to have a desired temperature. For example, the flexible conductive heating device of EX 2B was measured to have an initial resistance of 3 ohm. After 12 Vdc was applied to the device EX 2B for 5 minutes, a current measured from the device EX 2B was 0.10 A and a temperature measured from the device EX 2B was 58° C. This means that the resistance of the device EX 2B was raised to 120 ohm (12/0.10=120). The composition EX 2 was used in the device of EX 2B. In the temperature versus resistance graph shown in FIG. 11, when the resistance is raised to 120 ohm, the temperature of the composition EX 2 is theoretically raised to 60° C., which is close to the real temperature (58° C.). Furthermore, after 24 Vdc was applied to the device EX 2B for 5 minutes, a current measured from the device EX 2B was 0.05 A and a temperature measured from the device EX 2B was 81° C. This means that the resistance of the device EX 2B was raised to 480 ohm (24/0.05=480). In the temperature versus resistance graph shown in FIG. 11, when the resistance is raised to 480 ohm, the temperature of the composition EX 2 is theoretically raised to 80° C., which is close to the real temperature (81° C.).

In sum, the flexible conductive heating device of the disclosure is sensitive to current and temperature and has good mechanical and electrical properties and self limiting and self regulating properties. Therefore, the flexible conductive heating device of the disclosure is less likely to have safety concerns, and is useful in the fields of heating devices, heat preservation devices, over-current protection devices, etc.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A conductive heating composition comprising:
   a polyolefin elastomer in an amount ranging from 39 wt % to 50 wt % based on 100 wt % of a total weight of said conductive heating composition;
   a crystalline non-grafted polyolefin;
   a crystalline polymer which is grafted or copolymerized with a monomeric unit selected from carboxylic acid, carboxylic acid derivatives, and combinations thereof; and
   a conductive filler, wherein
   said conductive heating composition has a surface resistivity ranging from 1.0E+01 ohm to 1.0E+06 ohm, and a volume resistivity ranging from 8.0E+01 ohm-cm to less than 1.0E+05 ohm-cm;
   when said conductive heating composition is heated from 20° C. to 90° C., a log value of a resistance of said conductive heating composition increases with a slope ranging from 3E-02 to 9E-02; and
   after said conductive heating composition being tested according to ISO 132:1999 procedure 300 times, a surface resistance of said conductive heating composition at a room temperature increases by a rate of less than 300%.

2. The conductive heating composition according to claim 1, wherein said polyolefin elastomer has a shore A hardness ranging from 40 to 95.

3. The conductive heating composition according to claim 1, further comprising an additive selected from the group consisting of a volume filler, a flame retardant, a coupling agent, and combinations thereof.

4. The conductive heating composition according to claim 1, wherein said polyolefin elastomer is selected from the group consisting of ethylene-octene copolymer, ethylene-butene copolymer, ethylene-propylene copolymer, propylene-butene copolymer, butene-ethylene copolymer, butene-propylene copolymer, and combinations thereof.

5. The conductive heating composition according to claim 1, wherein said crystalline non-grafted polyolefin is selected from the group consisting of polyethylene, propylene, polyvinylidene fluoride, and combinations thereof.

6. The conductive heating composition according to claim 1, wherein said crystalline polymer is selected from the group consisting of ethylene vinyl acetate copolymer, ethylene butyl acrylate, ethylene methyl acrylate, ethylene acrylic acid, polyethylene grafted with ethylene-g-maleic anhydride, polyethylene grafted with ethylene-g-acrylic acid, and combinations thereof.

7. A flexible conductive heating device comprising:
   a flexible conductive heating substrate which is made of said conductive heating composition of claim 1, and which has a first major surface and a second major surface opposite to said first major surface in a thickness direction of said flexible conductive heating substrate; and
   at least one first electrode unit formed on said first major surface, and including
      a positive electrode including a first base portion and a plurality of first finger electrode portions which extend respectively from said first base portion, and which are arranged to be separated from each other, and
      a negative electrode including a second base portion which is spaced apart from said first base portion, and a plurality of second finger electrode portions which extend respectively from said second base portion, and which are arranged to be interdigitated with said first finger electrode portions,
   wherein two adjacent ones of said first and second finger electrode portions are spaced apart from each other by a first distance ranging from 0.5 mm to 20 mm, each of said first and second finger electrode portions being spaced apart from a respective one of said second and first base portions by a second distance, a ratio of the second distance to the first distance being larger than 0.8.

8. The flexible conductive heating device according to claim 7, further comprising at least one second electrode unit which is formed on said second major surface, and which includes
   a positive electrode including a first base portion and a plurality of first finger electrode portions which extend respectively from said first base portion, and which are arranged to be separated from each other, and
   a negative electrode including a second base portion which is spaced apart from said first base portion of said positive electrode of said second electrode unit, and a plurality of second finger electrode portions which extend respectively from said second base portion, and which are arranged to be interdigitated with said first finger electrode portions of said positive electrode of said second electrode unit,
   wherein each of said first finger electrode portions of said first electrode unit is overlapped with a respective one of said second finger electrode portions of said second electrode unit in the thickness direction by at least 10 percent area, and each of said second finger electrode portions of said first electrode unit is overlapped with a respective one of said first finger electrode portions of said second electrode unit in the thickness direction by at least 10 percent area.

9. The flexible conductive heating device according to claim 7, further comprising a second electrode unit which is formed on said second major surface, and which includes
- a positive electrode including a first base portion and a plurality of first finger electrode portions which extend respectively from said first base portion, and which are arranged to be separated from each other, and
- a negative electrode including a second base portion which is spaced apart from said first base portion of said positive electrode of said second electrode unit, and a plurality of second finger electrode portions which extend respectively from said second base portion, and which are arranged to be interdigitated with said first finger electrode portions of said positive electrode of said second electrode unit, wherein each of said first finger electrode portions of said first electrode unit is overlapped with a respective one of said first finger electrode portions of said second electrode unit in the thickness direction by at least 10 percent area, and each of said second finger electrode portions of said first electrode unit is overlapped with a respective one of said second finger electrode portions of said second electrode unit in the thickness direction by at least 10 percent area.

10. The flexible conductive heating device according to claim 7, wherein said first electrode unit is formed by hot pressing a metal foil on the first major surface of said flexible conductive heating substrate to form a metal layer, and patterning the metal layer to form said first electrode unit.

11. The flexible conductive heating device according to claim 7, wherein said first electrode unit is formed by screen printing a conductive paste or glue on said first major surface.

12. The flexible conductive heating device according to claim 7, wherein each of the positive and negative layers is coated with a layer made of an insulating or thermal conductive material.

* * * * *